United States Patent [19]

Baumert et al.

[11] Patent Number: 4,791,631

[45] Date of Patent: Dec. 13, 1988

[54] WIDE TOLERANCE, MODULATED BLUE LASER SOURCE

[75] Inventors: Jean-Claude J. E. Baumert, San Jose; Gary C. Bjorklund, Los Altos; Wilfried Lenth, Capitola; William P. Risk, III, Mountain View; Franklin M. Schellenberg, Cupertino, all of Calif.

[73] Assignee: International Business Machines Corporation, Armonk, N.Y.

[21] Appl. No.: 91,239

[22] Filed: Aug. 31, 1987

[51] Int. Cl.$^4$ .............................................. H01S 3/10
[52] U.S. Cl. ........................................ 372/22; 372/26; 372/21; 372/69; 372/75
[58] Field of Search ................. 372/21, 22, 69–78, 372/75, 27, 26, 41

[56] References Cited

U.S. PATENT DOCUMENTS

| | | | |
|---|---|---|---|
| 3,316,500 | 4/1967 | Newman | 372/75 |
| 3,735,280 | 5/1973 | Johnston, Jr. | 372/22 |
| 3,947,688 | 3/1976 | Massey | 372/22 |
| 4,386,428 | 5/1983 | Baer | 372/22 |
| 4,408,329 | 10/1983 | Ferguson | 372/21 |

OTHER PUBLICATIONS

Jones et al., "Millivolt-Level 213 nm Source Based on a Depet. Q Switched CW-Pumped Nd:YAG Laser", IEEE JQE 15(4), Apr. '79.

Primary Examiner—Léon Scott, Jr.
Attorney, Agent, or Firm—Henry E. Otto, Jr.

[57] ABSTRACT

A process and apparatus are disclosed for producing a beam of coherent radiation at essentially 459 nm by mixing, in a nonlinear crystal consisting essentially of KTP, two laser beams, one at essentially 1064 nm and the other at essentially 808 nm. The 1064 nm radiation is derived from a Nd:YAG laser that consists of an input mirror, an output mirror and a Nd:YAG crystal, and contains also the KTP crystal. The Nd:YAG laser is pumped by an essentially 808 nm semiconductor diode laser beam, which passes through the input mirror and through the KTP crystal into the Nd:YAG laser crystal where it is absorbed. The 1064 nm radiation oscillating inside the Nd:YAG laser resonator is mixed either with the said 808 nm pump beam or with 808 nm radiation provided by a second semiconductor diode laser whose light is coupled with the 1064 nm beam using a beamsplitter. The essentially 459 nm beam passes through the output mirror to a utilization device.

34 Claims, 4 Drawing Sheets

WIDE TOLERANCE, MODULATED BLUE LASER SOURCE

BACKGROUND OF THE INVENTION

1. Field of the Invention

This invention relates to a laser source and process for producing coherent radiation at a blue wavelength, and more particularly relates to a modulated laser source and process for producing said radiation upconverted by nonlinear optical means with noncritical phase matching over a wide range of ambient temperature variation, rendering it especially suitable for optical storage applications.

2. Prior Art

Laser sources have long been regarded as the primary light sources for optical storage applications. For such applications, the laser source should be compact, reliable, low cost and have sufficient power for high data rate recording and reading of data on an optical storage medium. For writing data, rapid modulation capability of the laser source is advantageous. Also, the source should provide a short wavelength output to maximize storage density. It is known that semiconductor diode lasers, such as GaAlAs lasers, can be used to pump a compact, solid state laser such as a Nd:YAG laser. However, the wavelength of such diode pumped laser sources has been too long for optical storage applications or other applications requiring short wavelength (blue) coherent radiation.

It is known to use birefringent nonlinear crystals to mix laser beams of two different frequencies and hence differing wavelengths to produce an upconverted beam of a third frequency and correspondingly different wavelength or to generate from a fundamental input wave a harmonic wave by frequency doubling techniques. It is also known that such mixing processes require phase matching for optimum conversion efficiency.

If it is necessary to employ an input laser beam having a predetermined fixed frequency, it is known that the phase matching of the system may be adjusted by changing the angle at which the beam passes through the birefringent crystal. However, the angle is critical and must be controlled to very tight tolerance to achieve acceptable phase matching.

It is also known that if an input wave can be propagated essentially along any x, y or z crystallographic axis of a nonlinear crystal of orthorhombic or higher symmetry, noncritical (acceptable tolerance) phase matching is achieved. This desirably increases the adjustment angle tolerance to as much as about 10°. However, this precludes adjustment by twisting the crystal. Also, it may require adjusting the ambient temperature to some unusual specific value and controlling that value within tight tolerance limits if operation is desired at some specific wavelength. Conversely, to operate at room temperature would require not only tight control of the temperature but operation at a corresponding critical wavelength.

The copending applcation of G. C. Bjorklund, U.S. Ser. No. 07/046,967, filed May 6, 1987, assigned to the assignee of the present invention, discloses a time modulated source of frequency doubled laser radiation in which a nonlinear crystal portion of a stripline electrical circuit is mounted within a laser cavity. The laser beam at a fundamental frequency impinges on and propagates through the nonlinear crystal. The stripline circuit is conditioned by a modulated high bandwidth electrical data signal to produce an output beam at a wavelength corresponding to the second harmonic of the fundamental frequency. The disclosed apparatus comprises a GaAlAs pumped Nd:YAG lasing rod, mirrors which are highly reflective at the fundamental wavelength, and a nonlinear crystal of potassium titanyl phosphate, $KTiOPO_4$, (hereinafter KTP) or other suitable material. However, these nonlinear materials generally require critical phase matching.

There is a need for an improved time modulated source of laser radiation which exhibits noncritical phase matching over a wide range of operating temperatures, is capable of modulation at the high data rates required for viable optical storage applications, is controllable by voltages approaching TTL level voltages (of less than 5 volts), and which does not require application of an external electric field by a stripline circuit or other means.

SUMMARY OF THE INVENTION

Toward this end and according to the invention, there is provided a process and time modulated source apparatus for producing coherent radiation at essentially 459 nm by mixing, in a nonlinear crystal consisting essentially of KTP, two laser beams, one at essentially 1064 nm and the other at essentially 808 nm. According to a preferred embodiment, each laser beam is derived from one or separate semiconductor lasers, and the process and apparatus embody the following novel and distinct features:

(1) Use of intracavity frequency mixing to upconvert a GaAlAs diode pumped Nd:YAG laser to 459 nm by mixing the 1064 nm internal field of a Nd:YAG laser cavity with single pass radiation at 808 nm provided preferably by the GaAlAs diode laser pump itself or, if preferred, by an auxiliary diode laser. This desirably provides intracavity enhancement of the 1064 nm intensity while allowing the upconverted 459 nm (blue) radiation to follow high speed modulation of the diode laser intensity.

(2) Use in this source and process of certain unique input wavelengths and of KTP nonlinear material which together have the unique property of providing room temperature sum-frequency generation with simultaneous wide angular tolerance and extraordinarily wide thermal tolerance. This makes possible the design of mechanically prealigned device configurations that can operate without need for thermal control.

(3) Use of a diode laser pump having a wavelength of essentially 808 nm which simultaneously satisfies the requirement for noncritical frequency mixing with 1064 nm radiation in KTP and which is coincident with a strong absorption line for pumping a Nd:YAG laser gain medium.

The foregoing and other features and advantages of the invention will be apparent from the following more particular description of preferred embodiments thereof as illustrated in the accompanying drawings.

DETAILED DESCRIPTION OF PREFERRED EMBODIMENTS

FIG. 1

Figure 1:
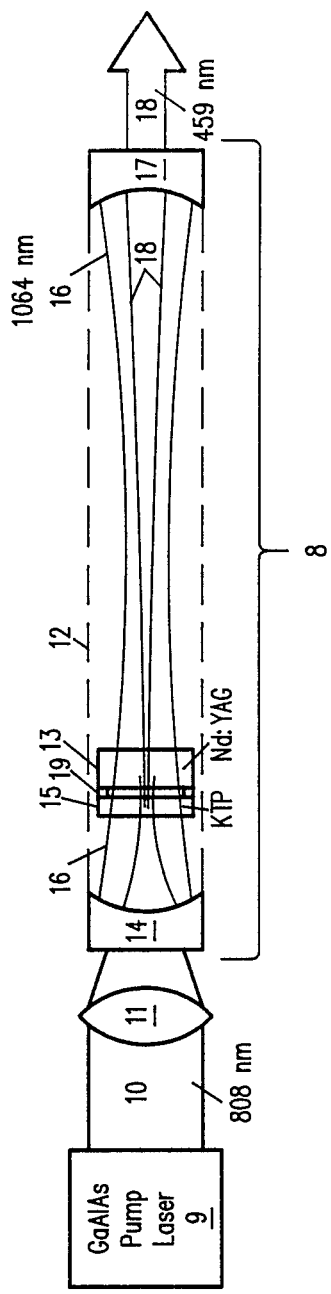
FIG. 1 is a schematic side view, to exaggerated scale for clarity, of an optical system embodying the present invention.

As illustrated in FIG. 1, the optical system, according to this embodiment of the present invention, comprises a GaAlAs diode laser 9 (or, if preferred, a diode laser array) with collimating optics and a modulated output beam 10 having a wavelength of 808 nm focused longitudinally by a lens 11 into the cavity 12 of a Nd:YAG laser 8. After passing through an input laser mirror 14, the 808 nm beam 10 passes through a nonlinear crystal 15 consisting essentially of KTP and is absorbed in the crystal of Nd:YAG laser medium 13, pumping a laser transition to emit a beam 16 having a wavelength of 1064 nm. An output laser mirror 17 and the input laser mirror 14 are both coated to be high reflectors at 1064 nm, so no 1064 nm power is directly coupled out, and a powerful internal field at 1064 nm builds up inside the cavity 12. The 808 nm beam 10 and 1064 nm beam 16 mix within the KTP crystal 15 to form a beam 18 of coherent radiation at a wavelength of essentially 459 nm that passes without significant loss through the Nd:YAG laser crystal and output laser mirror 17 to a utilization device (not shown). Since the power of Nd:YAG laser 8 varies slowly in response to modulation of the GaAlAs laser 9, high speed modulation of the power of the generated 459 nm beam 18 will follow exactly the modulation of the 808 nm pump 9, provided that the average power at 808 nm is maintained at a level that keeps the 1064 nm intracavity laser power substantially constant.

The KTP crystal 15 is xyz cut with polished faces perpendicular to the crystallographic y-axis and aligned within the laser cavity 12 in such a way that the laser beams 10,16 propagate substantially down the y-axis with the 808 nm beam 10 polarized mostly in the y direction and the 1064 nm beam 16 polarized mostly in the x direction. The generated 459 nm beam 18 will propagate parallel to the other beams 10,16 and be polarized in the x direction. For maximum conversion efficiency, the KTP crystal 15 should be placed at the beam waist in cavity 12.

In this embodiment, input laser mirror 14 should be coated to be a high reflector (HR) at 1064 nm and antireflecting (AR) at 808 nm. Output laser mirror 17 should be HR at 1064 nm and AR at 459 nm. The input surface (facing mirror 14) of KTP crystal 15 should be AR at 1064 nm and at 808 nm, while its output (opposite) surface should be AR at 1064 nm, 808 nm, and 459 nm. The input surface (facing crystal 15) of Nd:YAG crystal 13 should be AR at 1064 nm, 808 nm, and 459 nm, while its output surface should be AR at 1064 nm and at 459 nm and HR at 808 nm.

In our reduction to practice, a KTP crystal 15, 3.5 mm long, was separated by a spacer 19 of dielectric material about 125 microns from a 5 mm long Nd:YAG laser medium 13. This was to insure that a high intensity will be maintained for the 808 nm pump beam 10 in both of said crystals. Cavity 12 was formed from an input mirror 14 having a 0.9 cm radius of curvature and an output mirror 17 having a 5 cm radius of curvature. The cavity length was adjusted to be approximately the sum of the mirror radii (i.e., 5.9 cm), which produced a small waist approximately 0.9 cm from the input mirror 14.

The waist region was, and should preferably be, substantially equal to and coincident with the length of KTP crystal 15. With the crystals 15,13 so positioned, the waist is close enough to input mirror 14 to assure tight focusing of the beam 10 from pump laser 9.

The KTP and Nd:YAG crystals were mounted in a special housing (not shown) which in turn was mounted in a mirror gimbal (not shown) that permitted it to be tilted to optimize the blue output beam 18. Lens 11 had a focal length of 40 mm. Light at 808 nm pumped from laser 9 at 275 mW provided approximately 1 mW of 459 nm (blue) light in a clean spatial mode. Intracavity power at 1064 nm is estimated to be approximately 10 W with this degree of pumping. The 275 mW which was used for pumping is within the range of commercially available diode arrays. However, since such arrays are presently available with output power up to 1 W, diode pumping can reasonably be expected to generate several mW of 459 nm output.

FIG. 2

Figure 2:
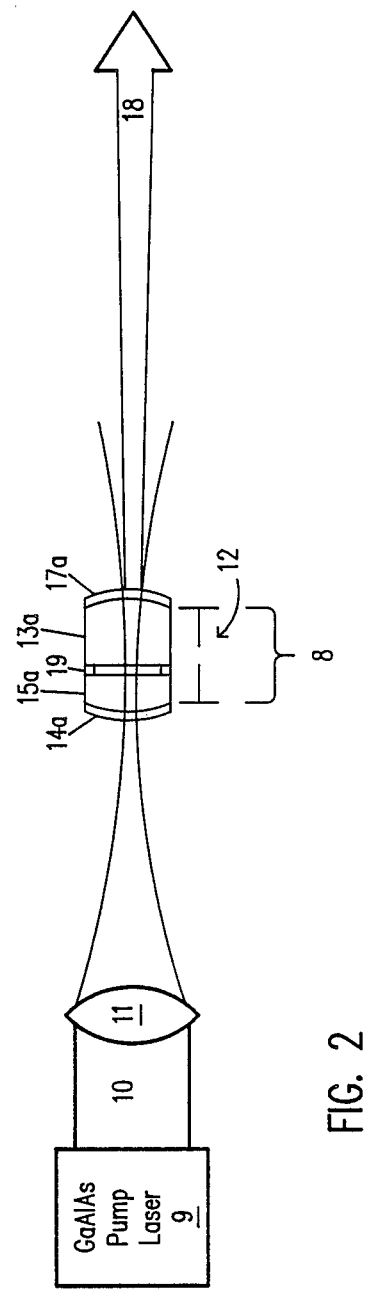
FIGS. 2, 3 and 4 are schematic side views of optical systems according to an alternate embodiments of the invention.

The alternative embodiment illustrated in FIG. 2 differs from that in FIG. 1 in that the back and front mirrors 14 and 17 are replaced by integral mirrors formed by coatings 14a,17a HR at 1064 nm placed directly on the input surface of KTP crystal 15a and output surface of the Nd:YAG laser crystal 13a. As illustrated, surface 14a is curved. However, if preferred, a hemispherical cavity with beam waist at the input surface of KTP crystal 15a can be produced by curving the output face of the Nd:YAG crystal 13a with all other surfaces remaining planar. Alignment of the laser cavity is adjusted by tilting Nd:YAG crystal 13a with respect to KTP crystal 15a and is permanently maintained by use of spacer 19. In addition to being HR at 1064 nm, the input surface of KTP crystal 15a should be AR at 808 nm, while its output surface should be AR at 1064 nm, 808 nm, and 459 nm. The input surface of Nd:YAG crystal 13a should be AR at 1064 nm, 808 nm, and 459 nm while its output surface should be HR at 1064 nm and at 808 nm and AR at 459 nm. In this embodiment, high speed modulation is achieved in the same way as for the embodiment of FIG. 1.

FIG. 3

Figure 3:
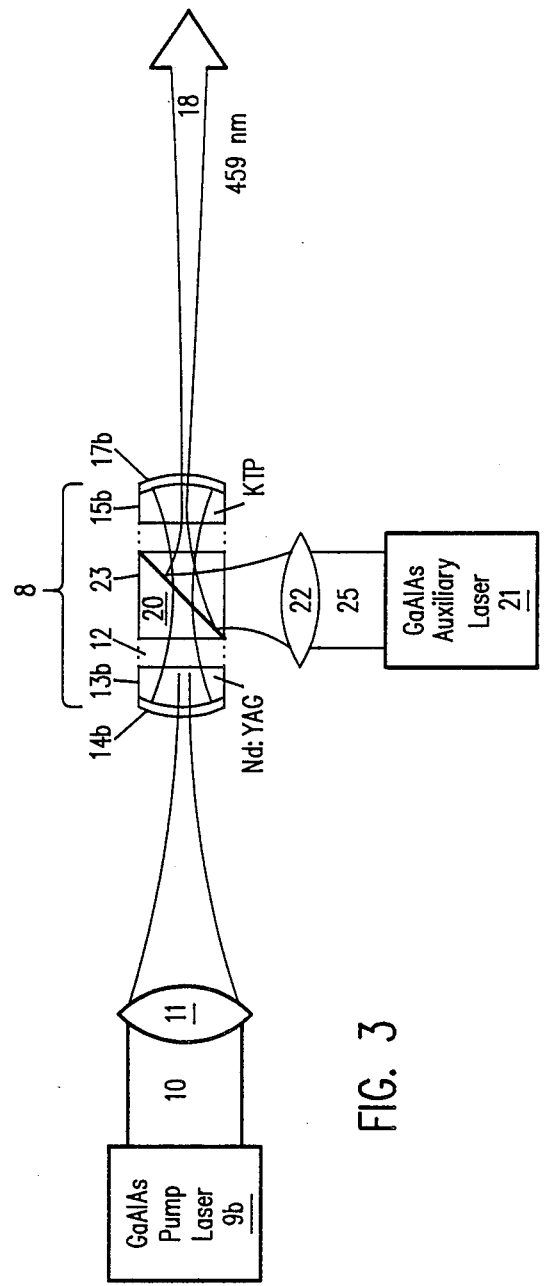
Figure 4:
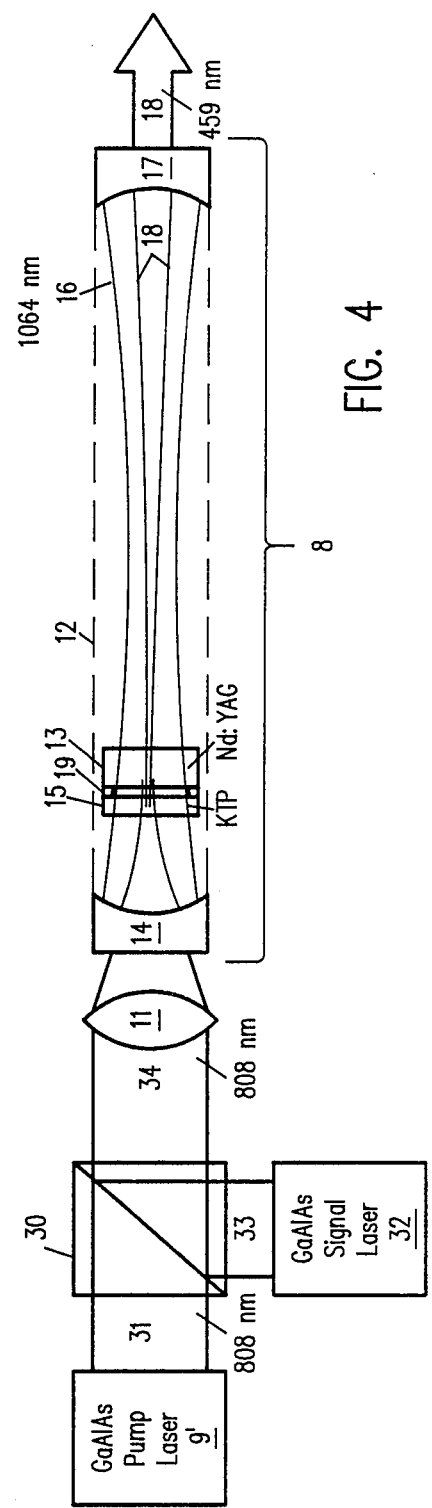

The embodiment illustrated in FIG. 3 differs from that in FIG. 1 in the following respects. A polarizing beamsplitter 20 is used to polarize the 1064 nm internal field and to couple in an auxiliary, modulated GaAlAs laser 21 to provide the 808 nm beam 25 focused by a lens 22 that mixes with the 1064 nm internal field. GaAlAs laser 9b can be operated continuous wave (CW) or quasi CW and does not have to have a wavelength constrained to exactly 808 nm, but rather a wavelength chosen to optimize pumping of the Nd:YAG laser medium 13b. The advantage of this approach is that arbitrary modulation codes can be used for the signal fed into auxiliary GaAlAs laser 21 with no restriction on average power level.

As illustrated, a cavity is produced by utilizing integral mirrors formed by coatings 14b,17b, curving the now input surface of the Nd:YAG laser medium 13b and of the KTP crystal 15b, and reversing the order of the Nd:YAG medium 13b and KTP crystal 15b from that shown in the embodiments of FIGS. 1 and 2. The curved input surface of Nd:YAG crystal 13b should be HR at 1064 nm and AR at the GaAlAs pump wavelength while the output surface should be AR at 1064 nm and HR at the wavelength of pump 9b. The input surface of the beamsplitter cube 20 should be AR at 1064 nm. The beamsplitting coating 23 should be HR for polarized 808 nm and AR for orthogonally polarized 1064 nm. The output surface of the beamsplitter cube 20 should be AR at 1064 nm and 808 nm. The input surface of KTP crystal 15b should be AR at 1064 nm and 808 nm and its output surface should be HR at 1064 nm and AR at 459 nm.

FIG. 4

This embodiment differs from that of FIG. 1 in that a polarizing conventionally coated beamsplitter 30 is placed outside laser cavity 12; the GaAlAs pump diode laser 9' is operated CW rather than with modulation to provide a beam 31 at essentially 808 nm; and a GaAlAs signal diode laser 32 is operated to provide a modulated beam 33 at essentially 808 nm. Beamsplitter 30 combines the 808 nm beams 31,33 into a beam 34. Laser beam 33 of laser 32 has the correct polarization to produce mixing, while the laser beam 31 of laser 9' has polarization orthogonal to that of beam 33. Hence, the blue 459 nm radiation produced depends only on the modulated signals of laser 32, and the 1064 nm radiation depends only on the CW pump laser 9'. Thus, arbitrary modulation codes can be applied to the signal laser 32, while the 1064 nm power will remain high due to pumping primarily by pump laser 9'. The coatings on mirrors 14,17 are the same as stated for FIG. 1.

GENERAL

Additional experimentation was conducted for the KTP crystal 15 in a series of measurements with no resonant cavity to determine the angular and temperature tolerances for mixing 1064 nm and 808 nm radiation to produce 459 nm radiation. In an xyz-cut KTP crystal 15 3.5 mm long, the nominal direction of propagation was down the y-axis. The 1064 nm beam was provided by a lamp pumped CW Nd:YAG laser, and a beam tunable around 808 nm was provided by a CW dye laser. The 1064 nm and 808 nm beams were always copropagating and orthogonally polarized with the nominal directions of polarization along the x-axis and z-axis, respectively. Under these conditions, the generated 459 nm radiation emerged polarized in the x direction.

Figure 5A:
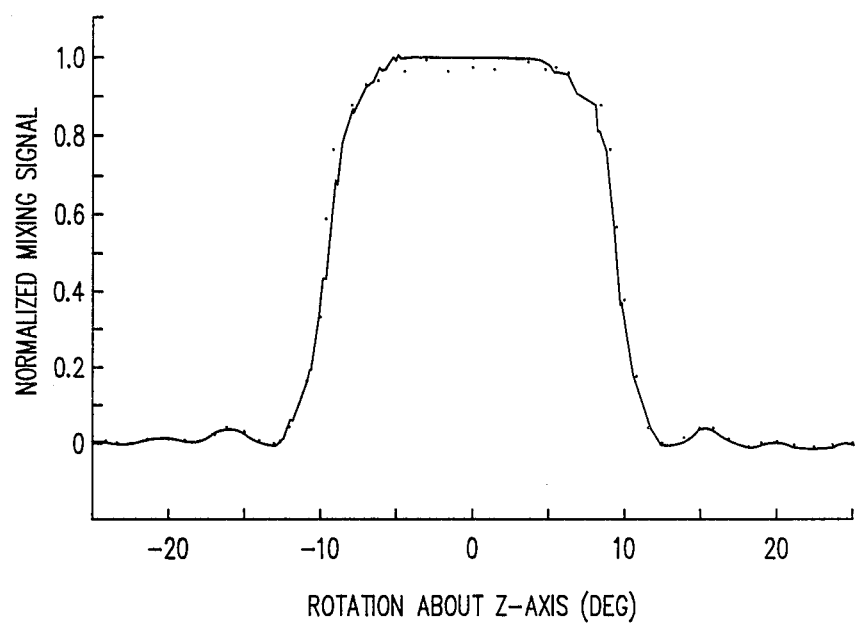
FIGS. 5a and 5b are plots of output power versus external horizontal angle of incidence and external vertical angle of incidence, respectively, to depict acceptable angular orientation tolerance ranges achieved in systems embodying the invention.
Figure 5B:
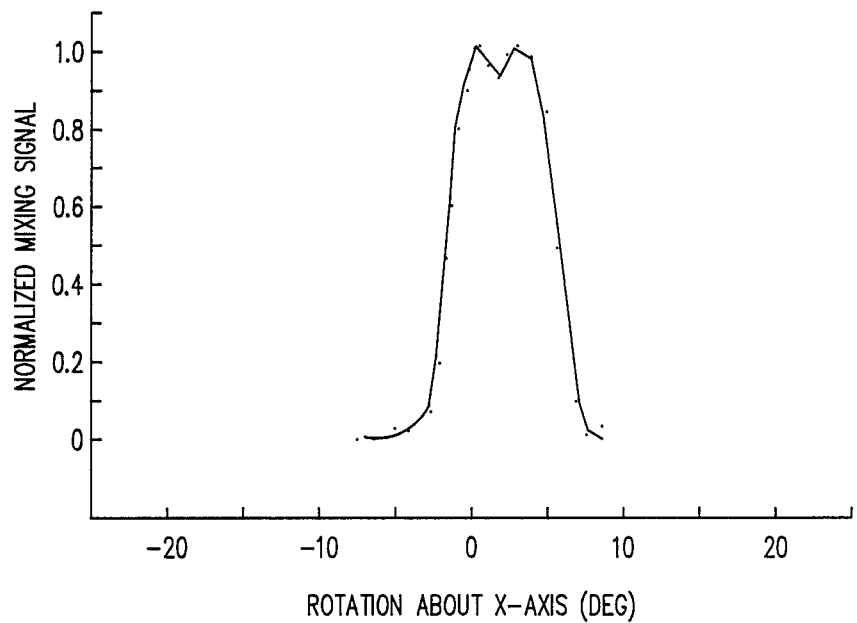

The angular acceptances were measured by monitoring the output power as a function of external angle of incidence as the crystal was rotated about the z-axis (FIG. 5a) and x-axis (FIG. 5b). This experiment was done at room temperature with the dye laser set at 808.7 nm. As can be seen from FIG. 5a, these angular acceptances were ±10° and ±4° for rotation about the z-axis and x-axis, respectively. These large angular acceptances are typical for "noncritically phase matched" frequency mixing processes that occur when phase matching can be achieved for beam propagation directions along one of the principal axes.

Figure 6:
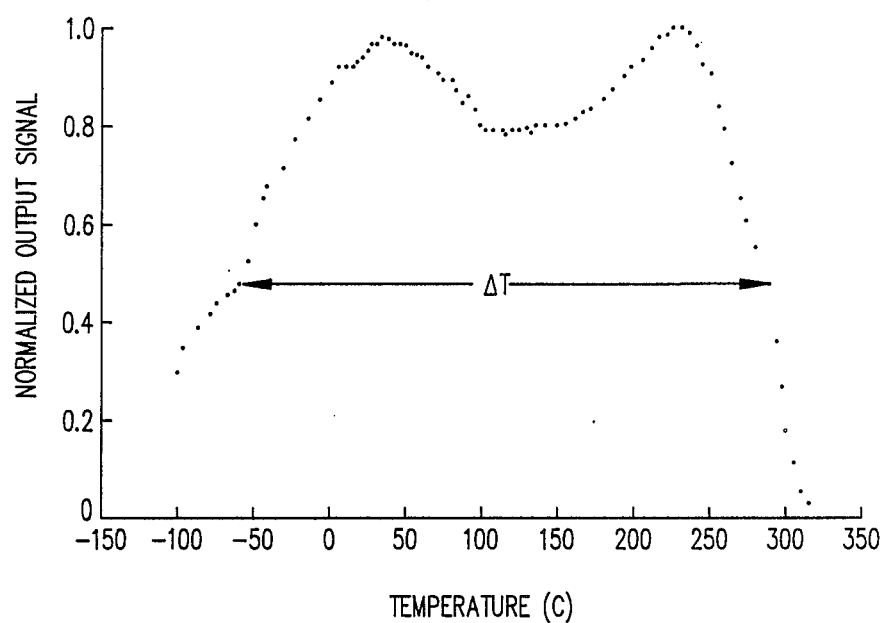
FIG. 6 is a plot of output power versus temperature showing the acceptable temperature tolerance range in systems embodying the invention.

The temperature tolerance was determined by monitoring the output power as a function of temperature with the dye laser set at essentially 808 nm and the direction of propagation exactly along the y-axis. FIG. 6 shows the results. Clearly the temperature tolerance is extraordinarily wide, over ±160° C. as measured at the full width ΔT at half maximum signal. This exceeds by two orders of magnitude the largest previously observed temperature tolerance for a noncritically phase matched mixing process of any type.

The simultaneously achieved wide angular acceptance and temperature tolerance have very important implications for device applications. It is no longer necessary to provide means of critically adjusting the angle and/or temperature of the crystal. Standard mechanical means should be sufficient to provide acceptable prealignment of the angle of the KTP crystal. The temperature tolerance of from approximately −60° to +280° C. measured at half maximum height is sufficient to encompass the entire range of possible operating temperatures for such applications as optical storage.

Figure 7:
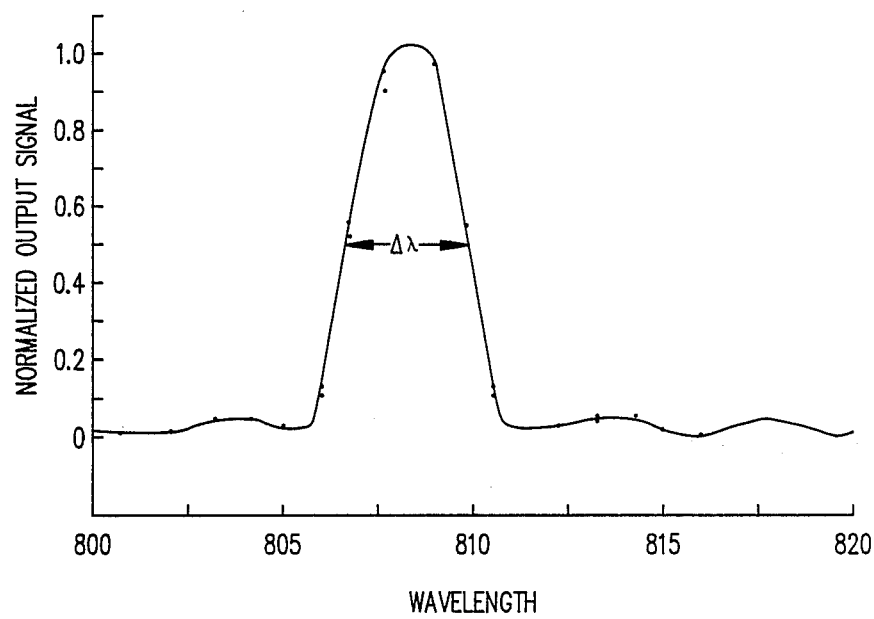
FIG. 7 is a plot of output power versus wavelength showing maximum power at essentially 808 nm in systems embodying the invention.

Finally, the tolerance on the wavelength of the 808 nm beam was determined by monitoring the output power as the laser was tuned. The experiment was done at room temperature with the direction of propagation exactly along the y-axis. FIG. 7 shows the results. The wavelength tolerance Δλ at full width, half maximum signal is ±1.6 nm from 808 nm and to be included by use of the term "at essentially 808 nm" as recited in the claims.

It will thus be seen that the process and apparatus above described for producing a beam of coherent radiation at essentially 459 nm is especially suitable for high data rate optical recording requiring wide temperature and angular tolerance, operable at low logic level voltages and not requiring application of external electric fields.

While the embodiments above described employ a Nd:YAG laser gain medium for driving the 1064 nm radiation, it will be understood that, if preferred, such radiation may be provided by other lasers of III-V or II-IV semiconductor combinations and by Nd in other hosts.

The embodiments, as illustrated, show the KTP crystal mounted in the Nd:YAG laser cavity. However, if preferred, it will be understood that the KTP crystal can be mounted in a separate passive cavity resonant at essentially 1064 nm or 808 nm.

While the invention has been shown and described with reference to preferred embodiments thereof, it will be understood by those skilled in the art that the foregoing and other changes and variations in form and detail may be made therein without departing from the spirit, scope and teaching of the invention. Accordingly, the method and apparatus herein disclosed are to be considered merely as illustrative and the invention is to be limited only as specified in the claims.

Having thus described the invention, what is claimed as new, and desire to secure by Letters Patent is:

1. A process for producing a beam of coherent radiation at essentially 459 nm including the step of mixing, in a nonlinear crystal consisting essentially of KTP, two fundamental laser beams, one at essentially 808 nm and the other at essentially 1064 nm.

2. A process according to claim 1, including the step of:

deriving the essentially 1064 nm beam from a Nd laser comprising a Nd-containing laser gain medium, a pumping source, and mirror means forming an optical cavity.

3. A process according to claim 2, including the step of:
polarizing the essentially 1064 nm beam.

4. A process according to claim 1, including the step of:
deriving the 808 nm beam from a semiconductor diode laser.

5. A process according to claim 1, including the step of:
using a semiconductor diode laser to provide the input from which both the essentially 808 nm and 1064 nm beams are derived.

6. A process according to claim 1, including the step of:
using one semiconductor diode laser to provide the essentially 808 nm beam and another semiconductor diode laser to provide a beam with a wavelength chosen to optimize pumping a laser transition to emit the essentially 1064 nm beam.

7. A process according to claim 1, including the step of:
deriving the essentially 1064 nm beam from a laser consisting essentially of III-V or II-IV semiconductor combinations.

8. A process according to claim 1, including the step of:
disposing said nonlinear crystal in a cavity resonant at essentially either 1064 nm or 808 nm.

9. A process according to claim 1, including the steps of:
deriving the essentially 1064 nm beam from a Nd laser comprising a Nd-containing laser gain medium, a pumping source, and mirror means forming an optical cavity that is resonant at essentially 1064 nm;
deriving the 808 nm beam from a semiconductor diode laser; and
mounting said crystal and laser medium within said cavity.

10. A process according to claim 9, including the step of:
providing the mirror means with facing surfaces which reflect at essentially 1064 nm, but are antireflective at essentially 808 nm and 459 nm, respectively.

11. A process according to claim 9, including the step of:
mounting a beamsplitter outside the optical cavity of the Nd laser for combining a pumping beam with an essentially 808 nm beam.

12. A process for producing a modulated beam of coherent radiation at essentially 459 nm including the steps of:
mixing, in a nonlinear crystal consisting essentially of KTP, two fundamental laser beams at essentially 808 nm and at essentially 1064 nm, respectively,
operating one of said laser beams CW; and
operating the other of said laser beams with modulation.

13. A process according to claim 12, including the step of:
deriving the essentially 1064 nm beam from a Nd laser comprising a Nd-containing laser gain medium, a pumping source, and mirror means forming an optical cavity.

14. A process according to claim 13, including the step of:
polarizing the essentially 1064 nm beam.

15. A process according to claim 12, including the step of:
deriving the 808 nm beam from a semiconductor diode laser.

16. A process according to claim 12, including the step of:
using a semiconductor diode laser to provide the input from which both the essentially 808 nm and 1064 nm beams are derived.

17. A process according to claim 12, including the step of:
using one semiconductor diode laser to provide the essentially 808 nm beam and another semiconductor diode laser to provide a beam chosen to optimize pumping a laser transition to emit the essentially 1064 nm beam.

18. A process according to claim 12, including the step of:
deriving the essentially 1064 nm beam from a laser consisting essentially of III-V or II-IV semiconductor combinations.

19. A process according to claim 12, including the steps of:
deriving the essentially 1064 nm beam from a Nd laser comprising a Nd-containing laser gain medium, a pumping source, and mirror means forming an optical cavity that is resonant at essentially 1064 nm;
deriving the 808 nm beam from a semiconductor diode laser; and
mounting said crystal and laser medium within said cavity.

20. Apparatus for generating from two fundamental laser beams, one at essentially 808 nm and the other at essentially 1064 nm, a coherent output at essentially 459 nm, comprising:
a nonlinear crystal of essentially KTP which generates the 459 nm beam from the two fundamental laser beams.

21. Apparatus of claim 20, including:
a Nd laser for providing the essentially 1064 nm beam, comprising a Nd-containing laser gain medium, a pumping source, and mirror means forming a resonant optical cavity.

22. Apparatus of claim 20, including: beam.

23. Apparatus of claim 20, includig:
one semiconductor diode laser to provide the essentially 808 nm beam; and
another semiconductor diode laser to provide a beam with a wavelength chosen to optimize pumping a laser transition to emit the essentially 1064 nm beam.

24. Apparatus of claim 21, including:
means for polarizing the essentially 1064 nm beam.

25. Apparatus for generating a coherent output at essentially 459 nm, comprising
first means providing a fundamental laser beam at essentially 808 nm;
second means providing a fundamental laser beam at essentially 1064 nm; and
a nonlinear crystal consisting essentially of KTP and operative to mix said fundamental beams to produce the coherent output.

26. Apparatus of claim 25, wherein:

said first means comprises a semiconductor diode laser;

said second means comprises a Nd laser including a Nd-containing laser gain medium, a pumping source, and mirror means forming an optical cavity that is resonant at essentially 1064 nm; and said crystal and laser medium are disposed within said cavity.

27. Apparatus of claim 26, wherein:

the mirror means has facing surfaces which reflect at essentially 1064 nm, but are antireflective at essentially 808 nm and 459 nm, respectively.

28. Apparatus of claim 26, including:

a beamsplitter disposed outside the optical cavity of the Nd laser for combining a pumping beam with an essentially 808 nm beam.

29. Apparatus for generating a modulated beam of coherent radiation at essentially 459 nm, comprising:

first means providing a fundamental laser beam at essentially 808 nm;

second means providing a fundamental laser beam at essentially 1064 nm;

one of said means operating CW and the other means operating with modulation; and a nonlinear crystal consisting essentially of KTP and operative to mix said fundamental beams to produce the coherent radiation.

30. Apparatus of claim 29, wherein:

said one means has the correct polarization to produce mixing within said crystal, and said other means has a polarization orthogonal to that of said one means whereby the essentially 459 nm generated radiation depends solely on the modulated signals of said other means.

31. Apparatus of claim 29, wherein:

said first means comprises a semiconductor diode laser;

said second means comprises a Nd laser including a Nd-containing laser gain medium, a pumping source, and mirror means forming an optical cavity that is resonant at essentially 1064 nm; and said crystal and laser medium are disposed within said cavity.

32. Apparatus of claim 31, including:

a beamsplitter disposed outside said optical cavity for combining said pumping source and modulated beam.

33. Apparatus of claim 29, including:

means providing reflective/antireflective coatings for converting the 808 nm beam into a laser beam at essentially 1064 nm.

34. Apparatus of claim 33, wherein:

the means of claim 33 comprises external reflecting optics.

* * * * *

UNITED STATES PATENT AND TRADEMARK OFFICE
CERTIFICATE OF CORRECTION

PATENT NO. : 4,791,631

DATED : December 13, 1988

INVENTOR(S) : Jean-Claude J. E. Baumert et al.

It is certified that error appears in the above-identified patent and that said Letters Patent is hereby corrected as shown below:

IN THE SPECIFICATION

Column 1, line 61, "applcation" should be --application--.

Column 4, line 15, "special" should be --suitable--.

IN THE CLAIMS

Column 8, line 49, "22. Apparatus of claim 20. including: beam." should be --22. Apparatus of claim 20, including:
    a semiconductor diode laser for providing the 808 nm beam.--

Column 8, line 50, "includig" should be --including--.

Signed and Sealed this

Seventeenth Day of October, 1989

Attest:

DONALD J. QUIGG

Attesting Officer

Commissioner of Patents and Trademarks